(12) United States Patent
Ting et al.

(10) Patent No.: US 7,552,119 B2
(45) Date of Patent: Jun. 23, 2009

(54) APPARATUS AND METHOD FOR SKIPPING XML INDEX SCANS WITH COMMON ANCESTORS OF A PREVIOUSLY FAILED PREDICATE

(75) Inventors: Edison Lao Ting, San Jose, CA (US); Tuong Chanh Truong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 11/613,757

(22) Filed: Dec. 20, 2006

(65) Prior Publication Data

US 2008/0154893 A1 Jun. 26, 2008

(51) Int. Cl.
*G06F 17/30* (2006.01)
(52) U.S. Cl. .......................... 707/6; 707/102
(58) Field of Classification Search ............. 707/6, 707/102
See application file for complete search history.

(56) References Cited

U.S. PATENT DOCUMENTS

| | | | |
|---|---|---|---|
| 6,738,755 B1 | 5/2004 | Freytag et al. | |
| 6,829,606 B2 | 12/2004 | Ripley | |
| 6,947,927 B2 | 9/2005 | Chaudhuri et al. | |
| 7,020,651 B2 | 3/2006 | Ripley | |
| 7,086,042 B2 | 8/2006 | Abe et al. | |
| 7,107,282 B1 | 9/2006 | Yalamanchi | |
| 7,315,852 B2 | 1/2008 | Balmin et al. | |
| 7,346,609 B2 * | 3/2008 | Chen et al. ..................... | 707/3 |
| 7,451,144 B1 | 11/2008 | Koudas et al. | |
| 2003/0084025 A1 | 5/2003 | Zuzarte | |
| 2003/0163285 A1 | 8/2003 | Nakamura et al. .......... | 702/179 |
| 2003/0200502 A1 | 10/2003 | Abe et al. | |
| 2003/0212662 A1 | 11/2003 | Shin et al. ..................... | 707/2 |
| 2003/0229617 A1 | 12/2003 | Rjaibi et al. | |
| 2004/0111396 A1 | 6/2004 | Musayev et al. | |
| 2004/0181521 A1 | 9/2004 | Simmen | |
| 2004/0236722 A1 | 11/2004 | Waas et al. | |
| 2004/0260675 A1 | 12/2004 | Bruno et al. | |
| 2004/0261019 A1 | 12/2004 | Imamura et al. ............. | 715/513 |
| 2005/0050016 A1 | 3/2005 | Stanoi et al. .................. | 707/3 |
| 2005/0091188 A1 | 4/2005 | Pal et al. ....................... | 707/1 |

(Continued)

OTHER PUBLICATIONS

"An Efficient Xpath Query Processor for XML Streams" Chen, Y.; Davidson, B.S.; Zheng, Y., IEEE 2006.

(Continued)

*Primary Examiner*—Etienne P LeRoux
*Assistant Examiner*—Cindy Nguyen
(74) *Attorney, Agent, or Firm*—Kunzler & McKenzie

(57) ABSTRACT

An apparatus and method are disclosed for skipping XML index scans with common ancestors of a previously failed predicate. An XML index is scanned by an XML index scan to filter entries of the index matching at least one search value (predicate) of an XML query. When the XML index scan finds a matching entry, the entry is passed to an XPath evaluation component. The XPath evaluation component evaluates the entry against remaining predicates of the XML query for further qualification. When the XPath evaluation component disqualifies an entry, the XPath evaluation component provides feedback to the XML index scan to skip remaining entries comprising a common ancestor of the disqualified entry's path. The XML index scan can then efficiently skip index entries that will not qualify against the XML query.

5 Claims, 7 Drawing Sheets

U.S. PATENT DOCUMENTS

| | | | |
|---|---|---|---|
| 2005/0097078 A1 | 5/2005 | Lohman et al. | |
| 2005/0097084 A1 | 5/2005 | Balmin et al. | 707/3 |
| 2005/0108209 A1 | 5/2005 | Beyer et al. | |
| 2005/0131914 A1 | 6/2005 | Abdo et al. | |
| 2005/0203957 A1* | 9/2005 | Wang et al. | 707/104.1 |
| 2005/0228779 A1 | 10/2005 | Chaudhuri et al. | |
| 2005/0229158 A1 | 10/2005 | Thusoo et al. | 717/115 |
| 2005/0235356 A1 | 10/2005 | Wang | |
| 2005/0257201 A1 | 11/2005 | Rose et al. | |
| 2005/0267866 A1 | 12/2005 | Markl et al. | |
| 2006/0064432 A1 | 3/2006 | Pettovello | 707/103 |
| 2006/0075000 A1 | 4/2006 | Kleewein et al. | 707/203 |
| 2006/0106758 A1 | 5/2006 | Chen et al. | 707/2 |
| 2006/0218194 A1* | 9/2006 | Yalamanchi | 707/104.1 |
| 2007/0208769 A1 | 9/2007 | Boehm et al. | |
| 2007/0233645 A1 | 10/2007 | Peterson et al. | |
| 2007/0245325 A1 | 10/2007 | Lapounov et al. | |
| 2007/0250473 A1 | 10/2007 | Larson et al. | |
| 2007/0299834 A1 | 12/2007 | Liu et al. | |
| 2008/0120321 A1* | 5/2008 | Liu et al. | 707/102 |

OTHER PUBLICATIONS

Balmin et al., "Grouping and Optimization of XPath Expressions in System RX".

Freire et al., "A Flexible Infrastructure for Gathering XML Statistics and Estimating Query Cardinality," Proceedings of the 20 st Int'l Conference on Data Engineering, 2004.

Ramanath et al., "IMAX: Incremental Maintenance of Schema-Based XML Statistics," Proceedings of the 21st Int'l Conference on Data Engineering, 2005.

Beyer et al., "System RX: One Part Relational, One Part XML," SIGMOD 2005, Jun. 14-16, 2005, Baltimore, MD, USA.

McHugh et al., "Query Optimization for XML," Proc. of Very Large Data Bases, Edinburgh, U.K., 1999.

"Efficient Evaluation of Multiple Queries On Streaming XML Data" ACM Digital Library/INSPEC, Lee, M.L. et al.; 2002.

"WMS and GML based Interoperable Web Mapping System" ACM Digital Library/INSPEC, Shekhar et al.; 2001.

"XSQ: A Streaming Xpath Engine" ACM Digital Library, Peng, F. et al.; 2005.

"Multi-level Operator Combination in XML Query Processing" ACM Digital Library, Al-Khalifa, S. Et al.; 2002.

"An XML Query Engine for Network-Bound Data" ACM Digital Library, Ives, Z.G. et al.; 2002.

"Timber: A native XML database" Jagadish, H.V. et al., The VLDB Journal, 2002.

"Cost-based optimization in DB2 XML" Balmin, A. et al., IBM Systems Journal, vol. 45, No. 2, 2006.

"Cost-Sensitive Reordering of Navigational Primitives" Kanne, C.C. et al., ACM, 2005.

"Structural Join Order Selection for XML Query Optimization" Wu, Y. et al., IEEE 2003.

Dunren et al., "Query Optimization in XML Structured-Document Databases", May 14, 2005.

Lukichev et al., "XML Query Algera for Cost-based Optimization", University of Saint-Petersburg.

Kader et al., "XQuery Optimization in Relational Database Systems".

* cited by examiner

400

| PATH | DOCUMENT | NODEID | VALUE |
|---|---|---|---|
| doc-purchaseOrders-po-items-item-price | doc1 | 1.1.1.2.1.3 | 30 |
| doc-purchaseOrders-po-items-item-price | doc1 | 1.1.1.2.2.3 | 15 |
| doc-purchaseOrders-po-items-item-price | doc1 | 1.1.2.2.1.3 | 15 |
| doc-purchaseOrders-po-items-item-price | doc1 | 1.1.2.2.2.3 | 8 |

FIG. 4

APPARATUS AND METHOD FOR SKIPPING XML INDEX SCANS WITH COMMON ANCESTORS OF A PREVIOUSLY FAILED PREDICATE

BACKGROUND OF THE INVENTION

1. Field of the Invention

This invention relates to XML index scans and more particularly relates to skipping XML index scans with common ancestors of a previously failed predicate based on feedback received from a query evaluation.

2. Description of the Related Art

XPath is an expression language optimized for addressing elements of an XML document. The XML document may be analyzed as an XML tree by placing each element of the XML document as a node in the XML tree. The XML tree will include parent-child nodes directly related to the nested elements in the XML document. XPath expressions describe a path in the XML tree.

An XML index scan identifies paths of an XML document that satisfy a search query (typically an XPath expression). These paths are identified by searching an XML index. The search query may be an XML query designed to locate one or more entries in the XML document using one or more search values or predicates. The XML index includes entries that reference a path in the XML document, a node identifier for the path, a document identifier for the XML document, and a value in the XML document located by the path.

XPath expressions, also termed XML query expressions, may be derived from the XML query and used to locate elements that satisfy one or more search predicates of the XML query in the XML document. Accordingly, there can be one or more XML query expressions to completely describe the XML query. Subsequently, an XML index scan may filter the entries of the index by matching the index entries value against a predicate of the XML query. The XML index scan may provide the information of one of the filtered entries to an XPath evaluation component to further qualify the path against remaining predicates of the XML query. The XPath evaluation component uses this information in conjunction with remaining XML query p to traverse the XML document, to identify remaining predicates of the XML query, to locate a value in the XML document located by one of the remaining XML query expressions, and to determine if the value matches the XML query.

XML index scans filter entries in the index against a predicate of the XML query. Filtered entries are passed to the XPath evaluation component to further qualify the path against remaining predicates of the XML query. A lack of efficiency arises when the XML index scan locates and passes to the XPath evaluation component a path that contains the same qualities as a previously disqualified path. In this situation, the XPath evaluation component evaluates substantially redundant paths and disqualifies both of them for the same content. Consequently, it is possible that every path of a sub tree will be disqualified for the same reason; nevertheless every path in the index is still evaluated.

For example, an XML document describing purchase orders may contain several purchase orders. Each "po" element may have, as child nodes, a "billTo" element and "items" element. The "billTo" element may have, as child nodes, a "purchaserName" element and a "purchaserAddress" element each containing a value. Likewise, each "items" element may have, as child nodes, an "itemName" element with child nodes "productNumber," "quantity," and "price" each containing a value.

An XML query may search for a name under the "billTo" element and a price under the "itemsName" element. If the XML index includes entries whose paths lead to a "price" node, then the entries whose value further matches the predicate related to price will be sent to the XPath evaluation component even if the whole "po" sub tree should be avoided because it is the wrong "purhaserName" under the "billTo" element based on a different predicate.

From the foregoing discussion, Applicant asserts that a need exists for an apparatus and method that skips certain entries provided by an XML index scan. Beneficially, such an apparatus and method would save time by not processing disqualified XML document paths and thereby provide increased system throughput.

SUMMARY OF THE INVENTION

The present invention has been developed in response to the present state of the art, and in particular, in response to the problems and needs in the art that have not yet been fully solved by currently available XML index scanning and evaluating techniques. Accordingly, the present invention has been developed to provide an apparatus and method for skipping XML index scans with common ancestors of a previously failed predicate.

The apparatus to skip XML index scans with common ancestors is provided with a logic unit containing a plurality of modules configured to functionally execute the necessary steps of skipping XML index scans based on feedback provided by an XPath evaluation component that indicates disqualified paths. These modules in the described embodiments include an index module, an XPath evaluation component, and a skip module.

The apparatus, in one embodiment, is configured to receive an XML query which includes search predicates for locating information within an XML document. An XML index of the XML document may include entries that satisfy an XML query expression of the XML query. An index module may filter the index entries according to one or more of the search predicates. These filtered entries may be passed by the index module, one by one, to the XPath evaluation component to be evaluated against remaining predicates of the XML query. The remaining predicates are the search predicates not used to filter the index entries provided by the index module.

The apparatus is further configured, in one embodiment, to skip a set of index entries that will fail query evaluation. The skipped entries may have an ancestor XML node at a hierarchical level and position that matches an ancestor XML node at the hierarchical level and position of the associated selected entry that fails one of the remaining predicates. The XPath evaluation component may provide feedback to the index module indicating the hierarchical level and position. The skip module may use the feedback information to skip disqualified index paths. The skip module may also identify a subsequent entry in the index that has not been disqualified or evaluated so it may be evaluated.

A method of the present invention is also presented for skipping XML index scans with common ancestors of a previously failed predicate. The method in the disclosed embodiments substantially includes the steps necessary to carry out the functions presented above with respect to the operation of the described apparatus. In one embodiment, the method includes receiving an XML query which includes search predicates for locating information in an XML document. The method also may include scanning an index of the XML document using one or more search predicates, to filter entries in the index. The index may include entries that describe paths of the XML document that satisfy the one or more XML query expressions.

The method may evaluate a filtered entry from the index to determine whether it satisfies remaining predicates of the XML query. The remaining predicates may comprise search predicates not used to filter the index. If the entry fails evaluation, then information about that path is used to skip a set of index entries with similar information. The information may include an ancestor XML node at a hierarchical level and position that matches an ancestor XML node at the hierarchical level and position of the associated selected entry that fails one of the remaining predicates. The information may be a node identifier that is truncated to represent a node whose branches will fail query evaluation. The node identifier may be simply a node location within the tree structure, such as a numerical identifier. In another embodiment, the node identifier is the node location and a document identifier. In another embodiment, the node identifier is the node location combined with a hash algorithm.

Skipping a set of index entries may include matching the node identifier to remaining entries in the index. Those entries that match an ancestor XML node at a hierarchical level and position of the associated selected entry that fails one of the remaining predicates may be disqualified and need not be scanned or evaluated further. If more entries in the index require scanning and evaluating, then the method may also include incrementing a node identifier of a subsequent entry in the index that has neither been evaluated nor disqualified.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered as limiting of its scope, the invention will be described and explained with additional specificity and detail through the use of the accompanying drawings, in which:

FIG. 4 depicts an index of entries describing paths of the example XML document satisfying at least a portion of an XML query path in accordance with the present invention;

DETAILED DESCRIPTION OF THE INVENTION

Figure 1:
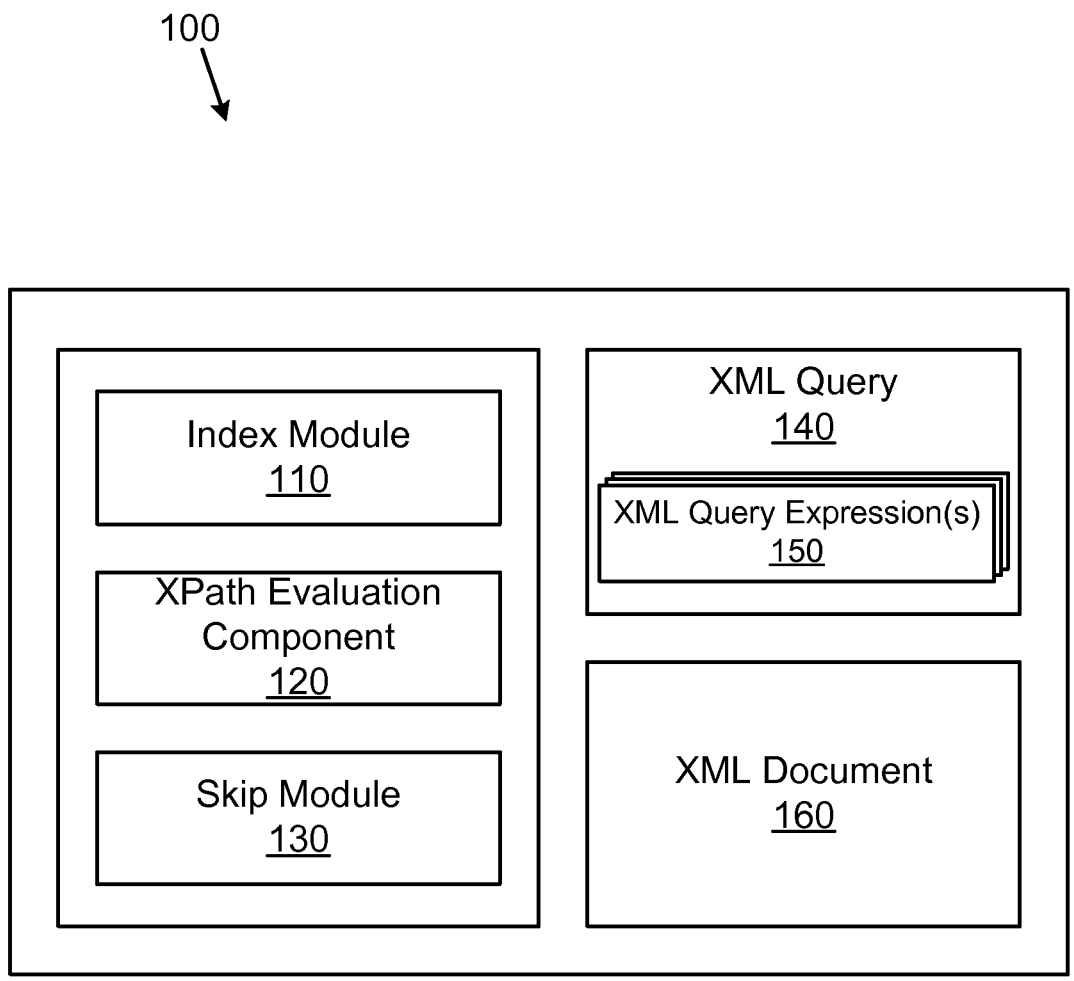
FIG. 1 is a schematic block diagram illustrating one embodiment of an XML environment for skipping XML index scans with common ancestors of a previously failed predicate in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an XML environment for skipping XML index scans with common ancestors of a previously failed predicate in accordance with the present invention. The XML environment 100 includes an index module 110, an XPath evaluation component 120, a skip module 130, an XML query 140, one or more XML query expressions 150, and an XML document 160. The depicted XML environment 100 is one embodiment for skipping XML index scan entries with common ancestors of a previously failed predicate in accordance with the present invention.

The index module 110 may receive an XML query 140 that includes one or more XML query expressions 150. In one embodiment, the XML query 140 includes one or more predicates. The index module 110 filters an index of the XML document 160. The index may include entries describing paths within the XML document 160. The entries in the index may satisfy one or more XML query expressions 150 of the XML query 140. In one embodiment, each indexed entry includes a path in the XML document, a document identifier, a node identifier, and a value. Elements of the indexed entry may facilitate further qualifying the entry against the XML query 140. For example, the index module 110 may filter the entries of the index by matching the value of the entry to a predicate of the XML query 140.

In one embodiment, the index module 110 delivers a filtered index entry to the XPath evaluation component 120. In another embodiment, the index module 110 delivers one or more elements of a filtered index entry to the XPath evaluation component 120. The XPath evaluation component 120 may evaluate the path of the filtered index entry against remaining predicates of the XML query 140. The remaining predicates may include the search values of the XML query 140 not used by the index module 110 to filter the index of the XML document 160.

The XPath evaluation component 120 may evaluate a path of a filtered index entry to determine the veracity of the entry. An evaluation of true may occur when the path matches the remaining predicates of the XML query 140 that the path is evaluated against. An evaluation of false may occur when the path does not match a remaining predicate of the XML query 140 that the path is evaluated against. When the XPath evaluation component 120 evaluates a path to be false, the XPath evaluation component 120 may provide feedback to the index module 110 identifying the failing path. In one embodiment, the feedback information includes an ancestor XML node at a hierarchical level and position that matches an ancestor XML node at the hierarchical level and position of the associated selected entry that fails one of the remaining predicates. A failed path may be identified using a node identifier to identify the location in the XML document 160 where the failure propagates from.

The skip module 130 may indicate a set of index entries for the index module 110 to skip. The skip module 130 may use a node identifier prefix of a path receiving a false evaluation from the XPath evaluation component 120 as an indicator of the set of index entries to skip. A node identifier prefix may be obtained by truncating the node identifier to locate a parent node where a branch to evaluate one or more remaining predicates occurs. The set of index entries to skip may be identified by an ancestor XML node at a hierarchical level and position that matches an ancestor XML node at the hierarchical level and position of the associated selected entry that fails one of the remaining predicates. In one embodiment, the skip module 130 works with the index module 110 to skip a set of index entries with the same node identifier prefix as a failed evaluated path.

By providing feedback information from the XPath evaluation component 120 to the index module 110, future index scans that will fail evaluation because of predetermined qualities are avoided. The skip module 130 may locate a subsequent entry which has not yet been evaluated by the XPath evaluation component 120. Since the index created by the index module 110 includes node identifiers with an entry, a path that contains the failed path may easily be located by comparing the node identifier fields in the index. Similarly, paths that have not yet failed may easily be determined in the same manner.

The XML query 140 may be a search query with several locations and values to search for. The values searched for may be known as predicates of the query. The query may be written in XML (extensible markup language). The XML query 140 may include one or more XML query expressions 150. An XML query expression 150 may include one or more search predicates and also may include the location to search. XPath (XML path language) is an expression language for addressing portions of the XML document 160. An XML query expression 150 may be an XPath expression. The index module 110 may utilize one or more XML query expressions 150 to index the XML document 160.

The XML document 160 may comprise elements, which may be nested. In the XML document 160, the elements may be represented as a tree structure with parent-child relationships; each element may be represented as a node with a unique node identifier, further, the child may include the node identifier of the parent to facilitate traversing through the XML document 160. For example, a parent node may have the node identifier of "1," its children may have node identifiers of "1.x" where "x" increments with each child, their children may have node identifiers of "1.x.y" where "y" increments with each child, and so on.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
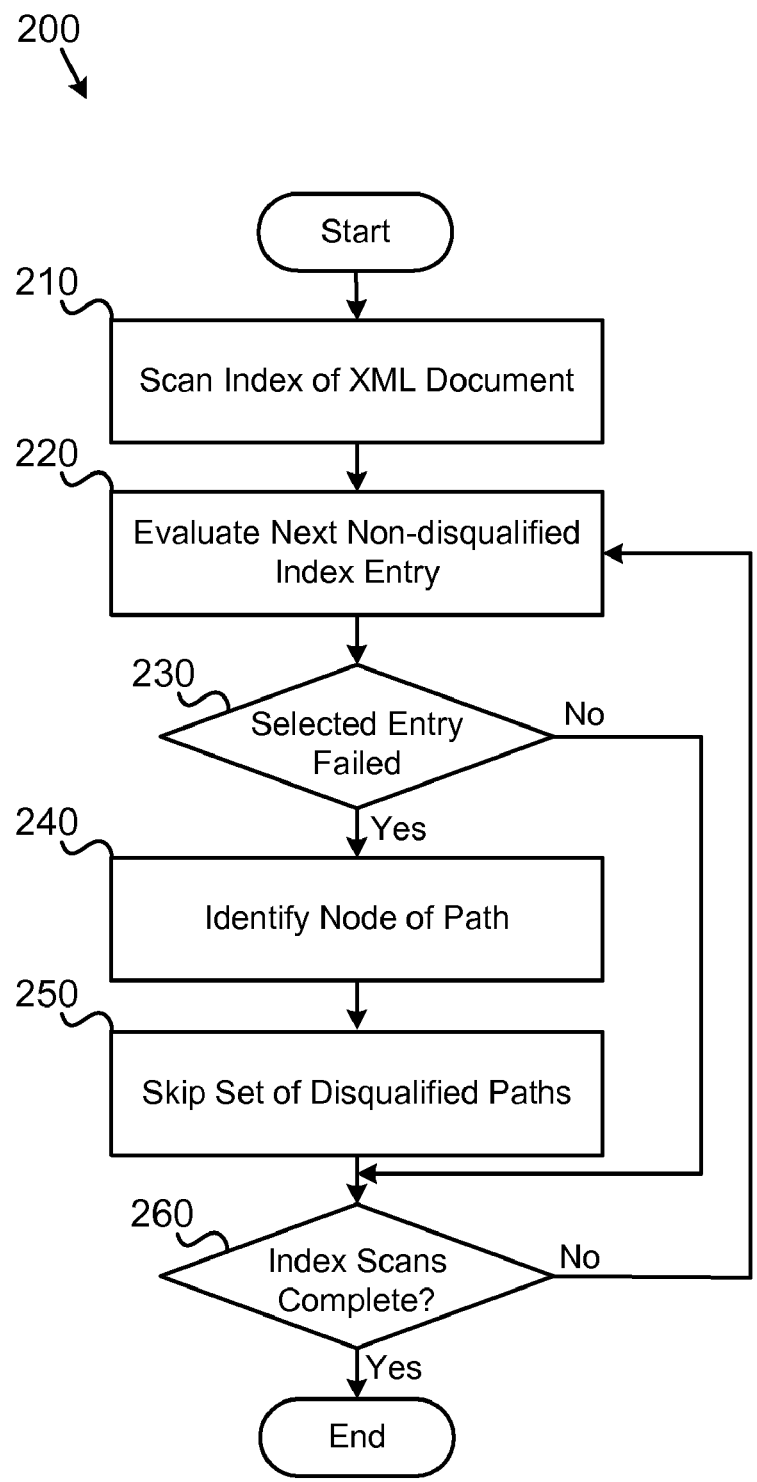
FIG. 2 is a schematic flow chart diagram illustrating one embodiment of a method for skipping XML index scans with common ancestors of a previously failed predicate in accordance with the present invention.
Figure 3:
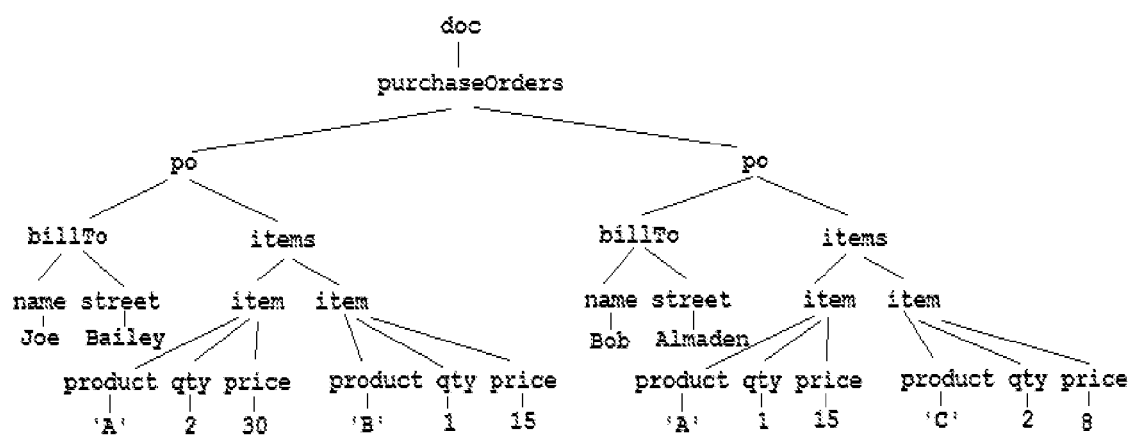
FIG. 3 is a depiction of an example XML document represented in a tree structure in accordance with the present invention.

FIG. 2 depicts one method for skipping XML index scans with common ancestors of a previously failed predicate in accordance with the present invention. The method 200 includes scanning 210 an index of an XML document, evaluating 220 a subsequent, non-disqualified index path, determining 230 if a selected entry failed, identifying 240 a node of the path, skipping 250 a set of disqualified paths, and deciding 260 whether index scans are complete. The depicted method 200 facilitates skipping XML index scans with common ancestors of a previously failed predicate in accordance with the present invention.

Scanning 210 an index of an XML document may include utilizing an index relating to the XML document. The index may include entries with elements describing paths satisfying one or more XML query paths. The entries may include a path, one or more identifiers, and a value. The identifiers may be a node identifier and a document identifier. Scanning 210 an index of an XML document may include filtering the entries in the index by one or more predicates of the XML query. The filtered entries may be passed one by one to be evaluated. In one embodiment, scanning 210 an index of an XML document includes sending a filtered entry to be evaluated against remaining predicates of the XML query. In another embodiment, scanning 210 an index of an XML document includes sending elements of a filtered entry such as the document identifier and node identifier for evaluation against remaining predicates of the XML query.

In one embodiment, evaluating 220 the subsequent, non-disqualified index path includes evaluating the filtered path against remaining predicates of the XML query. The remaining predicates may be the search values of the XML query not used to filter the index entries. For the first iteration of the index scan, the subsequent, non-disqualified index path might be obtained from the first entry in the index since there have been no evaluations yet to disqualify it. Evaluating 220 the subsequent, non-disqualified index path may evaluate the index entry to either true if it matches all remaining predicates or false if it does not match all remaining predicates.

In one embodiment, evaluating 220 the subsequent, non-disqualified index path includes truncating the received node identifier to locate a parent node where a branch to evaluate one or more remaining predicates occurs. For example, an XML document may have a tree structure that includes "doc" as a parent node with node identifier "1," "doc" has a "purchaseOrders" child with node identifier "1.1," "purchaseOrders" has children "po" with node identifiers "1.1.1" and "1.1.2," "po" with node identifier "1.1.1" has children "billTo" with node identifier "1.1.1.1" and "items" with node identifier "1.1.1.2," "billTo" has children "name" and "street" both containing values, "items" has multiple children "item" with node identifiers "1.1.1.2.x," and each "item" has children "product," "quantity," and "price."

In this example, one search value (i.e., predicate) of the XML query identifies a price and the other search value (i.e., predicate) identifies a name. The XML index identifies all paths in the XML document satisfying the XML query path relating to price. Scanning 210 an index of an XML document, in one embodiment, filters the entries of the index matching the search value (i.e., predicate) identifying price, so the remaining predicate identifies the name. The index will contain entries relating to the price path: doc/purchaseOrders/po/items/item/price. However, the remaining predicate to be evaluated relates to the path: doc/purchaseOrders/po/billTo/name. Therefore, the node identifier will be truncated at doc/purchaseOrders/po or "1.1.1" which is the location where the branch to evaluate the remaining predicate exists. If the path fails evaluation, all index entries with the node identification prefix of "1.1.1" will fail as well. Advantageously, the present invention accounts for this similarity and uses this to reduce the entries of the index that are scanned.

After evaluating 220 the subsequent, non-disqualified index path, determining 230 if the selected entry failed occurs. If the entry matches the remaining predicates, the entry is not disqualified and the method skips to deciding 260 whether the index scans are complete. If the entry does not match the remaining predicates, the entry fails and the method progresses to identifying 240 the node of the path.

Identifying 240 the node of the path may include acquiring the truncated node (i.e., node identification prefix) obtained from evaluating 220 the subsequent, non-disqualified index path. In one embodiment, the node identifier includes a document identifier as well as the node identifier. In another embodiment, the node identifier is combined with a hash function. Identifying 240 the node of the path may include acquiring an ancestor XML node at a hierarchical level and position that matches an ancestor XML node at the hierarchical level and position of the associated selected entry that fails one of the remaining predicates The identified node may be used as an identifier for skipping 250 the set of disqualified paths. Since the node has failed query evaluation once, that node is certain to fail every time it is evaluated against the current XML query. Therefore, skipping 250 the set of disqualified paths may include identifying entries in the index that include the disqualified node identification prefix.

After skipping 250 the set of disqualified paths, more index scans may be required so determining 260 whether the index scans are complete includes determining if additional entries in the index remain to be evaluated. When determining 260 if additional entries in the index remain to be evaluated, entries that have not been evaluated but have been skipped are not included with entries remaining to be evaluated. If more entries remain to be evaluated, then the method returns to evaluating 220 the subsequent, non-disqualified index path. If no more entries remain to be evaluated, then the method ends.

The following examples utilize FIGS. 3-7 for illustration purposes. Given the XML document represented as an XML tree in FIG. 3 along with an XML query: /purchaseOrders/po[billTo/name=Bob]/items/item[price>10]. In one embodiment, the Xml document has been indexed to create an XML index. The XML index may be created using the XPath /purchaseOrders/po/items/item/price. The XML index is represented by FIG. 4 which indicates the paths in the XML document that qualify against the XML query path used to generate the index.

The XML index may be used to filter out an item whose price is greater than 10, as indicated by a predicate of the XML query: [price>10]. The XML index scan may return the paths of the XML document indicated by the drawn boundaries around paths in FIG. 5 to the XPath evaluation component. (i.e. the first three rows of the table in FIG. 4) For each path indicated in FIG. 5, the XML index scan may deliver the location (NODEID in table of FIG. 4) of the path to the XPath evaluation component. The location identifies the XML document and the node of the path.

Figure 5:
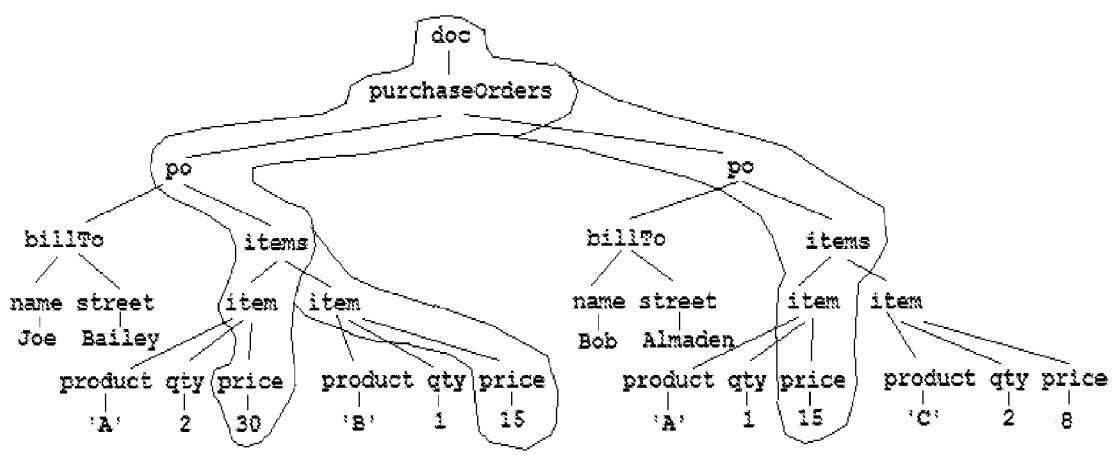
FIG. 5 depicts paths in an example XML document in accordance with the present invention.

For the first two paths indicated in FIG. 5, viewing from left to right, the remaining XML query path that the XPath evaluation component may evaluate may return an empty sequence because the predicate evaluates to false. The remaining XML query path is /purchaseOrders/po[billTo/name=Bob], the predicate is [billTo/name=Bob]. The XPath evaluation component evaluates the first path delivered to it by the XML index scan, which is the left most path identified in FIG. 5 or the first entry in the index of FIG. 4, "doc-purchaseOrderspo-items-item-price-30." The XPath evaluation component will traverse from the path starting from "doc-purchaseOrders-po" and traverse to the path "po-billTo-name," in order to evaluate "/purchaseOrders/po[billTo/name=Bob]." However, for the first two paths in the XML index of FIG. 4, the "billTo-name=Joe." So, the XPath evaluation component will evaluate the predicate, [billTo/name=Bob], to be false.

In the present invention, the XPath evaluation component, in one embodiment is enhanced to provide feedback to the XML index scan to skip the path "doc-purchaseOrders-po" on a next iteration since one of its descendents failed to pass the query evaluation. The XML index scan skips the index scan to the next "doc-purchaseOrders-po" sub tree and makes more efficient progress through the filtering process.

Figure 6:
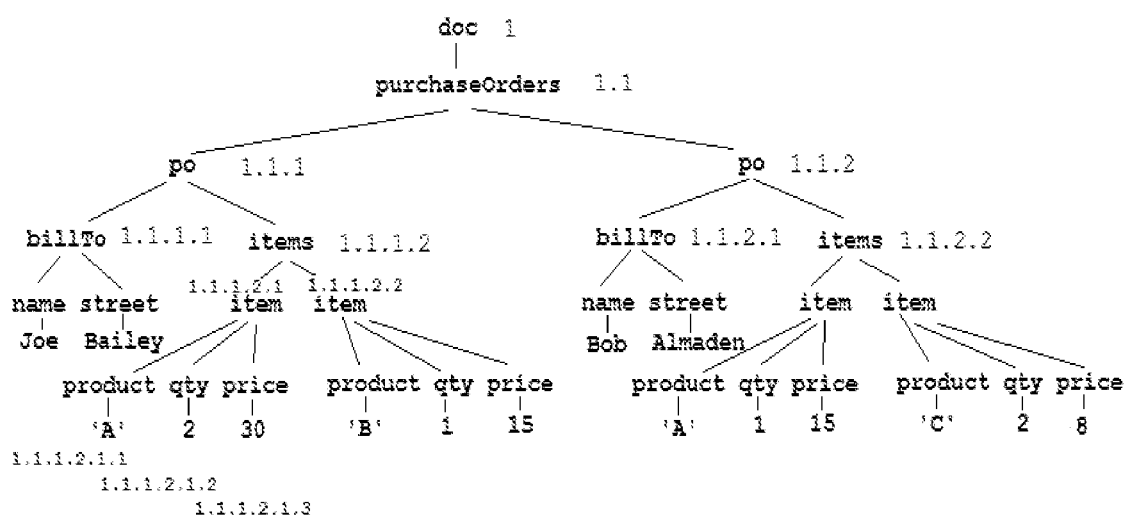
FIG. 6 depicts the node hierarchical structure of the example XML document when represented in tree structure in accordance with the present invention.
Figure 7:
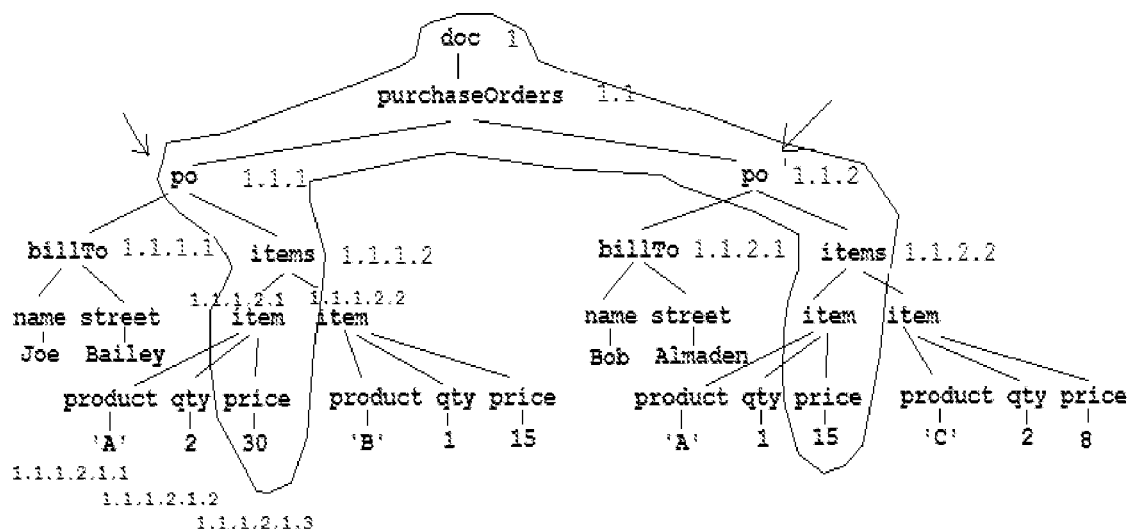
FIG. 7 represents traversed paths during an evaluation in accordance with the present invention.

Given the hierarchical structure in the XML tree in FIG. 6, a node identification of a child node is derived from a parent node and has an ordering sequence. And, given the index entries of FIG. 4 along with an XML query: /purchaseOrders/po [billTo/name=Bob]/items/item[price>10]. The XML index scan may evaluate part of the XML query: /purchaseOrders/po/items/item[price>10], to return entries one at a time to the XPath evaluation component. The three entries returned are the three paths indicated by FIG. 5.

The XML index scan will transmit the document identification and the node identification to the XPath evaluation component. For the first entry, the XML index scan will transmit to the XPath evaluation component the document identification of "doc1" and the node identification of "1.1.1.2.1.3." The XPath evaluation component identifies the remaining part of the XML query to be evaluated: /purchaseOrders/po[billTo/name=Bob]. As a result, the XPath evaluation component truncates the received node identification from "1.1.1.2.1.3" to "1.1.1," or from "doc-purchaseOrders-po-items-item-price" to "doc-purchaseOrders-po." The incoming path was six levels deep while the path requiring evaluation was also six levels deep, but branched off of the third level. The node identification "1.1.1" locates the first "doc-purchaseOrders-po" path in the document. The XPath evaluation component may be able to traverse from the node "1.1.1" to evaluate the remaining XML query path: /purchaseOrders/po /[billTo/name=Bob].

If the result of the evaluation returns false, as will be the case for the first two index entry locations, the XPath evaluation component will provide feedback to the XML index scan comprising the document identification "doc1" and the node identification "1.1.1." The XML index scan uses the document identification and node identification to skip through the next set of entries that no longer qualify. Any predicates for the sub tree "1.1.1" will not qualify and should be skipped. For node "1.1.1" the second index entry in FIG. 4 should be skipped since it uses the same node identification prefix "1.1.1." To accomplish this, the feedback information may be incremented, so the node identification prefix becomes "1.1.2" and the next entry equal to or greater than "1.1.2" may be evaluated. This effectively causes the XML index scan to pass over all index entries for the sub tree which has already failed a predicate of the XML query.

In the example, the next location the XML index scan provides to the XPath evaluation component will be document identification "doc1" and node identification "1.1.2.2.1.3. The node identification may be truncated to "1.1.2" which identifies the second "po" element in the XML document. As a result, the XML index scan traversed the paths circled in FIG. 7, while the XPath evaluation component traversed the paths identified by the arrows.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed for skipping XML index scans with common ancestors of a previously failed predicate, the operations of the computer program product comprising:

receiving an XML query comprising search predicates for locating information in an XML document;

selecting entries from an XML document index such that the selected entries satisfy at least one predicate of the XML query, the XML document index generated from the XML document using an XML query expression, the XML document index comprising one or more entries, each entry comprising an XML document path, a document identifier, a node identifier, and a value, wherein the XML document path describes paths to values of the XML document and the node identifier comprises one or more fields corresponding to one or more branches in an XML tree, wherein a single field corresponds to a single branch;

evaluating each of the selected entries to determine whether an XML document path in the selected entry satisfies the remaining predicates of the XML query, the remaining predicates being different from the at least one predicate of the XML query;

determining an XML document path in the selected entry that fails one of the remaining predicates; and skipping entries from the set of selected entries, each skipped entry identified by a node identifier for the entry wherein the node identifier comprises a field corresponding to the failed XML document path, the skipped entries having an ancestor XML node at a hierarchical level and position that matches an ancestor XML node at the hierarchical level and position of the associated selected entry that fails one of the remaining predicates.

2. The computer program product of claim 1, wherein the operations further comprise identifying the set of index entries not matching the remaining predicates of the XML query by using a truncated node identifier to indicate a disqualified path.

3. The computer program product of claim 1, wherein the operations further comprise incrementing a hierarchical level of a node identifier in feedback information that indicates entries not yet evaluated, wherein the hierarchical level corresponds to the failed XML document path.

4. An apparatus, the apparatus implemented on a processor and a memory programmed to skip XML index scans with common ancestors that match a previous failed predicate, the apparatus comprising:

an index module configured to receive an XML query comprising search predicates for locating information in an XML document;

the index module further configured to index the XML document using an XML query expression, the XML document index comprising one or more entries, each entry comprising an XML document path, a document identifier, a node identifier, and a value, wherein the XML document path describes paths to values of the XML document and the node identifier comprises one or more fields corresponding to one or more branches in an XML tree, wherein a single field corresponds to a single branch;

the index module further configured to select entries from the index such that the selected entries satisfy at least one predicate of the XML query;

an XPath evaluation component configured to determine a disqualified path comprising an XML document path in the selected entry that fails one of the remaining predicates; and a skip module configured to skip entries from the set of selected entries, each skipped entry identified by a node identifier for the entry wherein the node identifier comprises a field corresponding to the failed XML document path, the skipped entries having an ancestor XML node at a hierarchical level and position that matches an ancestor XML node at the hierarchical level and position of the associated selected entry that fails one of the remaining predicates, wherein the skip module is flirt her configured to increment a hierarchical level of a node identifier in feedback information that indicates entries to skip, wherein the hierarchical level corresponds to the failed XML document path.

5. The apparatus of claim 4, wherein the XPath evaluation component is further configured to identify a set of paths to skip using a truncated node identifier.

* * * * *